(12) United States Patent
Caruso et al.

(10) Patent No.: US 6,917,425 B2
(45) Date of Patent: Jul. 12, 2005

(54) WIDE-BAND SPECTROMETER WITH OBJECTIVE COMPRISING AN ASPHERICAL CORRECTOR MIRROR

(75) Inventors: Alberto Caruso, Florence (IT); Andrea Romoli, Florence (IT); Matteo Taccola, Florence (IT)

(73) Assignee: Galileo Avionica S.p.A., Florence (IT)

( * ) Notice: Subject to any disclaimer, the term of this patent is extended or adjusted under 35 U.S.C. 154(b) by 68 days.

(21) Appl. No.: 10/153,514

(22) Filed: May 22, 2002

(65) Prior Publication Data

US 2002/0176077 A1 Nov. 28, 2002

(30) Foreign Application Priority Data

May 25, 2001 (EP) ............................................. 01830338

(51) Int. Cl.[7] ................................................. G01J 3/28
(52) U.S. Cl. ...................................... 356/326; 356/328
(58) Field of Search ............................... 356/328, 326, 356/319, 324, 330, 334

(56) References Cited

U.S. PATENT DOCUMENTS

| | | | | |
|---|---|---|---|---|
| 3,900,263 A | * | 8/1975 | Hall, Jr. ..................... 356/300 |
| 4,984,888 A | | 1/1991 | Tobias | |
| 5,260,767 A | * | 11/1993 | Cook .......................... 356/326 |
| 5,452,085 A | * | 9/1995 | Fancy et al. ................ 356/326 |
| 5,880,834 A | * | 3/1999 | Chrisp ........................ 356/328 |
| 5,926,272 A | * | 7/1999 | Curtiss et al. .............. 356/326 |
| 6,288,781 B1 | * | 9/2001 | Lobb ........................... 356/326 |
| 6,549,280 B2 | * | 4/2003 | Riccardo et al. ........... 356/326 |

FOREIGN PATENT DOCUMENTS

| | | |
|---|---|---|
| EP | 0 316 802 | 5/1989 |
| EP | 0 403 228 | 12/1990 |
| WO | WO 98/37389 | 8/1998 |

* cited by examiner

Primary Examiner—Layla G. Lauchman
(74) Attorney, Agent, or Firm—McGlew and Tuttle, P.C.

(57) ABSTRACT

The spectrometer comprises at least a first optical path for a beam of electromagnetic radiation, along which the following are set: a beam-entry slit (1) for an incoming beam; a collimator (5) comprising a convergent spherical mirror for collimation of the incoming beam; a first dispersor (9) for dispersion of the beam into its chromatic components; a first focusing system (19); and a first detector (21) which receives the beam dispersed and focused by said first focusing system. Set along the first optical path there is set at least one first aspherical corrector element (7; 17) comprising an aspherical mirror for correction of spherical aberration.

23 Claims, 21 Drawing Sheets

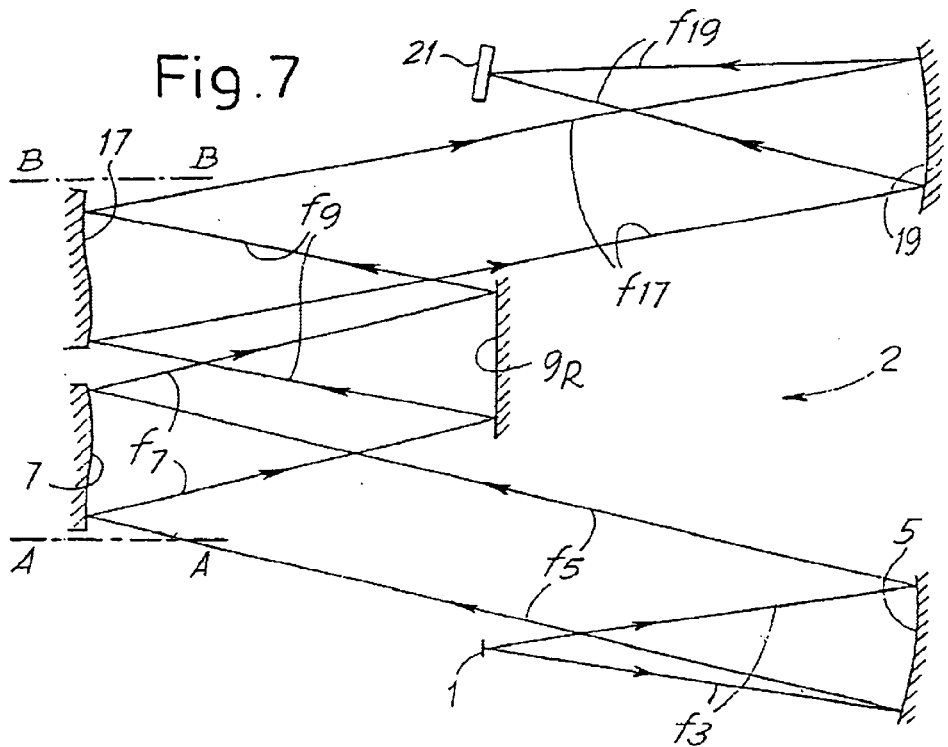
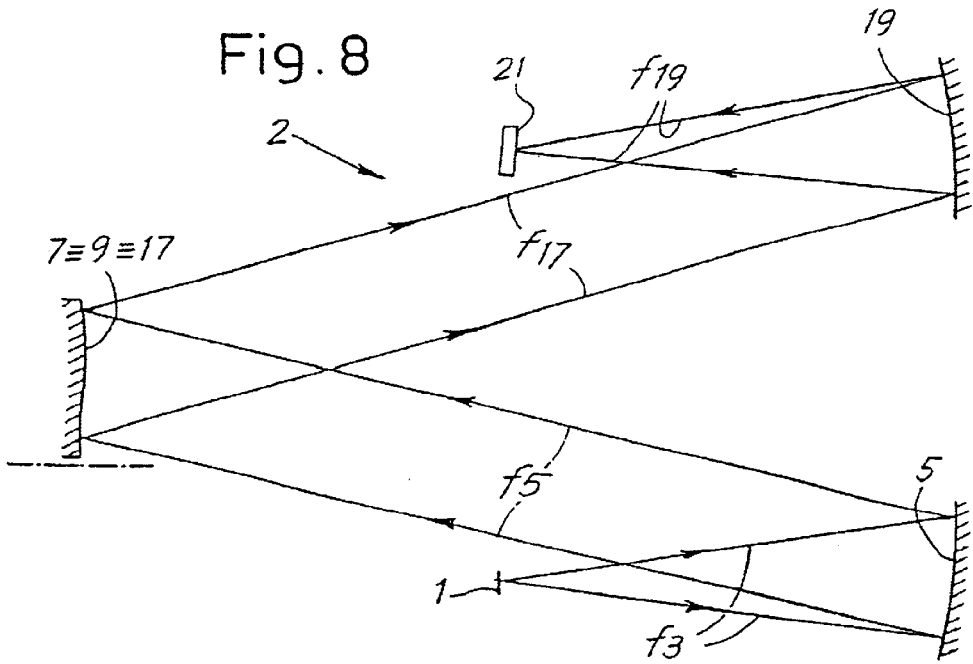

ΔH' = 2,3040

ΔZ' = 0,0000

ΔH' = 2,3315

ΔZ' = -0,0089

$\lambda = 0{,}4000\mu m$ $\Delta H' = 2{,}3161$
$\Delta Z' = -0{,}0061$ $\lambda = 1{,}4500\mu m$ $H' = -0{,}0010$
$Z' = 0{,}0000$ $\lambda = 2,5000 \mu m$ $\Delta H' = -2,9440 (mm)$ $\Delta Z' = -0,0027 (mm)$

WIDE-BAND SPECTROMETER WITH OBJECTIVE COMPRISING AN ASPHERICAL CORRECTOR MIRROR

TECHNICAL FIELD

The present invention relates to spectrometers, and in particular but not exclusively to imaging spectrometers.

STATE OF THE ART

A spectrometer is an optical system that conjugates an object in a superposition of chromatic images on the image plane in which a detector is located.

The images of each wavelength are translated in a direction, referred to as spectral direction, by an amount that depends upon the wavelength and follows a law of chromatic dispersion.

The object in the spectrometer is frequently an image coming from another optical system.

The object observed by the spectrometer is generally delimited by a rectangular diaphragm of field, referred to as slit.

The spatial direction and the spectral direction are defined with reference to the sides of the slit or of its images. The spatial direction is in general that of the major side of the rectangular of the slit, and the spectral direction is that of the minor side.

In all types of spectrometers, the image is formed by a superposition of chromatic images of the slit that are chromatically dispersed, i.e., translated in the spectral direction by an amount that depends upon the wavelength of the radiation.

The class of spectrometers is made up of generic spectrometers and imaging spectrometers.

There exists a substantial difference between a generic (non-imaging) spectrometer and an imaging spectrometer.

A non-imaging spectrometer performs a chromatic decomposition of the radiation coming from an extensive object (normally delimited by a rectangular-field diaphragm referred to as slit) and provides a measurement of the intensity of each chromatic component present in the object. This measurement is integrated in the spatial direction. This means that the detector situated on the focal plane of the spectrometer is unable to discriminate different points of the object (slit) in the spatial direction. In other words, if an electro-optical detector is used, it is generally a linear array.

Instead, in an imaging spectrometer, the detector is able to discriminate also in the spatial direction. In the case of electro-optical sensors, the array will be rectangular.

Accordingly, the quality of the chromatic images of the slit must be such as to enable resolution of details of the object in the spatial direction.

Basically the class of generic, i.e., non-imaging, spectrometers is a sub-class of imaging spectrometers. The present invention can apply both to imaging spectrometers and to non-imaging spectrometers.

FIG. 1 is a generic representation of a scheme of a spectrometer in a so-called Gaertner configuration. The spectrometer is made of three basic parts: a collimator C, a chromatically dispersing system or disperser D, and a focusing lens F. In the focus of the collimator C there is a slit S, which has a longitudinal development orthogonal to the plane of the figure.

An appropriate optical focusing system, not illustrated and extraneous to the spectrometer proper forms the image of the object to be analyzed on the slit S (if the object in question is at a distance a telescope will be used, whereas if the object is near an optical transport (relay) system, for example, a microscope lens, will be used).

The collimator C projects the image of the slit S at infinity, transforming the diverging beam f1 of rays coming from any point of the slit into a beam f2 of parallel rays. The inclination of this beam varies with the object point from which it comes in the direction normal to the drawing.

The rays thus collimated traverse the dispersing system D and are deviated, with different angles, according to the wavelength. Finally, the focusing objective F focuses the rays that have the same direction into one and the same image point. Consequently, images of the slit having different colours are formed on the focal plane P, said images varying their position in a direction orthogonal to the length of the slit.

The Gaertner configuration enables spectrometers to be made having focal distances of the collimator C and of the focusing objective F that are not necessarily equal. Consequently, magnifications other than 1× can be obtained.

An example of spectrometer of this type is described in EP-A-0316802.

The dispersor generically designated by D in FIG. 1 may be made up of one or more components, in the form of prisms (refractive disperser), diffraction gratings (diffractive dispersor), or mixtures of both (prisms and gratings, the so-called "grisms").

Using refractive or prismatic dispersors in an imaging spectrometer or diffraction gratings provided on curved surfaces, there may arise a phenomenon, which is generally undesirable, referred to as "curvature of the image of the slit", or "curvature of slit", or "smile". This phenomenon is illustrated in FIG. 2, where a number of ideal image points from P0 to P8 are represented, which are marked by a black dot and which are located on the perimeter of a rectangular grid, which has a height in the so-called "spatial direction" (vertical in FIG. 2) equal to the length of the slit, and a length (in the horizontal direction) corresponding to the extent, in the direction of chromatic dispersion, of the dispersed chromatic band. These points are as follows:

At the centre of the slit:
P4 at one extreme of the dispersed chromatic band
P5 at the other extreme of the band
P0 at the centre of the chromatic band
 At the top end of the slit:
P1 at one extreme of the dispersed chromatic band
P2 at the centre of the chromatic band
P3 at the other extreme of the band
 At the bottom end of the slit,
P6 at one extreme of the dispersed chromatic band
P7 at the centre of the chromatic band
P8 at the other extreme of the band.

The "true" images of the slit for three different colours are indicated by thick lines. The points from P'1 to P'8 represent the real images, affected by the distortions of the spectrometer, of the corresponding points from P1 to P8.

The curvature of the image of the slit or "smile" is the horizontal distance (i.e., along the spectral direction) of the real image points from the corresponding ideal image points. The smile is a function of the height h of the point considered on the slit and of the wavelength $\lambda$.

In addition to the above error, in this kind of apparatus there may also occur a so-called spatial co-registration error. The co-registration error is the distance of a "real" image point from its homologous ideal image point, measured in the spatial direction instead of in the spectral direction. This is indicated by SCRE in FIG. 5. This type of error derives from a chromatic variation of the magnification as a function of the field of view.

In addition to the errors referred to above, i.e., smile and spatial co-registration, in making a spectrometer it is necessary to take into account axial and extra-axial geometrical and chromatic aberrations, including curvature of field, which occurs when the image, instead of lying on a plane, lies on a curved surface (to a first approximation on a spherical cap). Since in an imaging spectrometer the sensitive elements of the detector generally lie in a plane, this aberration is highly undesirable and must be contained within the depth of focus or of field of the optical system, which is linearly dependent upon the wavelength and quadratically dependent upon the speed or f number. The variation in the size of the image of a point, due to curvature of field, is quadratically dependent upon the distance from the centre, i.e., upon the height of the field of view.

On the other hand, even more important is the correction of aberration, and in particular of curvature of field, for systems with small f numbers (speed or f number is given by the ratio A=focal length/effective maximum diameter), i.e., ones with larger apertures. The possibility of working with low f numbers constitutes an important prerogative for a high-performance imaging spectrometer. A larger extension of the field of view is another very important feature for an imaging spectrometer.

Correction of curvature of field, together with correction of other forms of aberration, enables a better resolution of the optical system to be achieved and hence enables use of detectors with pixels of smaller dimensions. This leads to systems with shorter focal lengths and consequently to systems of smaller dimensions. Of course, given the same resolution and the same radiometric efficiency, the smaller the pixel, the greater must be the aperture of the spectrometer, and hence the smaller the f number.

OBJECTS AND SUMMARY OF THE INVENTION

An object of the present invention is to provide a spectrometer that enables reduction of the errors referred to above and reduction or elimination of chromatic aberration.

The above and further objects and advantages, which will appear clearly to persons skilled in the field from the ensuing text, are basically obtained by means of a spectrometer comprising at least one first optical path for a beam of electromagnetic radiation, there being set along said optical path the following: a beam-entry slit for an incoming beam; a collimator for collimation of the incoming beam; a first disperser for dispersion of the beam into its chromatic components; a first focusing system; and a first detector which receives the beam dispersed and focused by said first focusing system; along said first optical path there being set at least one first aspherical corrector element for correction of spherical aberration. Characteristically, according to the invention, the collimator comprises a convergent spherical mirror, the focusing system comprises a convergent spherical mirror, and the first aspherical corrector element comprises a first aspherical mirror, i.e., a reflecting Schmidt plate for eliminating spherical and axial aberration. With a configuration of this type excellent optical qualities are obtained in terms of bandwidth and reduction or cancelling-out of geometrical aberration, as will be described in greater detail in what follows.

The aspherical mirror may form part of the collimator or else form part of the focusing system. Preferably, also a second aspherical corrector element is provided. This may consist of a dioptric Schmidt plate, i.e., one that works in transmission, with the beam to be corrected that traverses the plate itself instead of being reflected from it. However, to obtain qualitatively superior results, according to a further improvement of the present invention also the second aspherical corrector element is a reflecting element, i.e., an aspherical mirror. This makes it possible to prevent any introduction of a chromatic aberration that cannot be eliminated in dioptric Schmidt plates, i.e., that work in transmission.

To eliminate also the curvature of field without any constraints as to a particular choice of the focal lengths and as to a particular orientation of the optical devices that make up the system, according to a particularly advantageous embodiment the use is envisaged of a divergent spherical mirror (preferably associated to the collimator), which eliminates the curvature of field and of slit. This mirror is preferably set directly downstream of the beam-entry slit, between the latter and the converging mirror of the collimator.

In practice, the structure of the collimator comprising the aspherical corrector element and the converging spherical mirror is an off-axis Schmidt objective structure or (in the case of use of a diverging mirror for correction of the curvature of field) an off-axis Schmidt-Cassegrain objective, i.e., a system in which the optical axis does not coincide with the geometrical axis.

According to an improved embodiment of the present invention, the spectrometer may be provided with beam splitting according to two or more spectral channels. In particular, it is possible to envisage, along the first optical path, a beam splitter downstream of which the first optical path is prolonged until it reaches the first detector to form a first spectral channel. Once again downstream of the beam splitter there then develops a second optical path, constituting the second spectral channel, along which is set at least a second detector. It is to be understood that by using a number of dichroic mirrors or beam splitters, it is possible to obtain in a similar way also more than two spectral channels, and hence more than two optical paths terminating in respective detectors.

As will be explained more clearly with reference to a series of examples of embodiment, the division of the optical path into two (or more) separate spectral channels may be performed in various points of the first optical path so that the various optical paths will have in common a greater or lesser number of components. The choice of one or another of the various possible combinations depends, for example, upon requirements in terms of costs, overall dimensions, and reciprocal compatibility between the spectral bands that are to be treated by the spectrometer.

Further advantageous characteristics and embodiments of the present invention are indicated in the attached dependent claims.

BRIEF DESCRIPTION OF THE DRAWINGS

The invention will be better understood from the ensuing description and from the attached drawing which shows practical, non-limiting, embodiments of the invention. More in particular:

FIG. 7 is configuration of a grating spectrometer with mirror correctors;

FIG. 8 is an illustration of a compact configuration of the spectrometer of FIG. 7;

DETAILED DESCRIPTION OF PREFERRED EMBODIMENTS OF THE INVENTION

Figure 1:
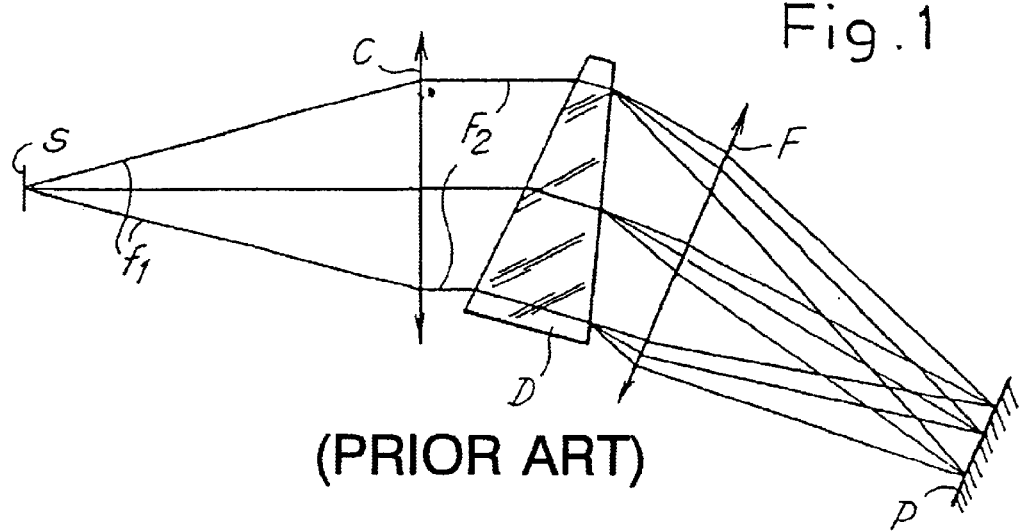
FIG. 1 is a prior art working diagram of a spectrometer in Gaertner configuration described previously.
Figure 2:
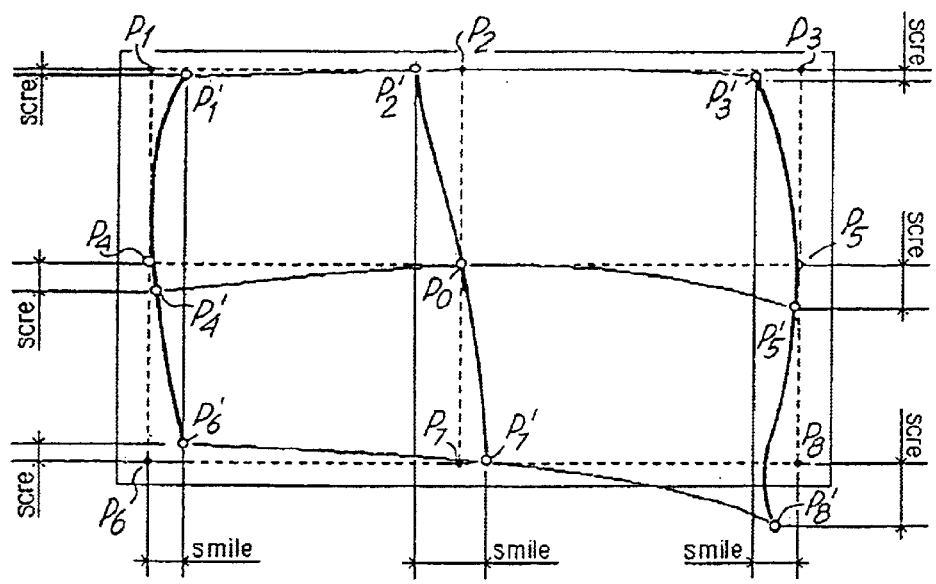
FIG. 2 is a schematic representation of the phenomenon of curvature of slit and of spatial co-registration error.
Figure 3:
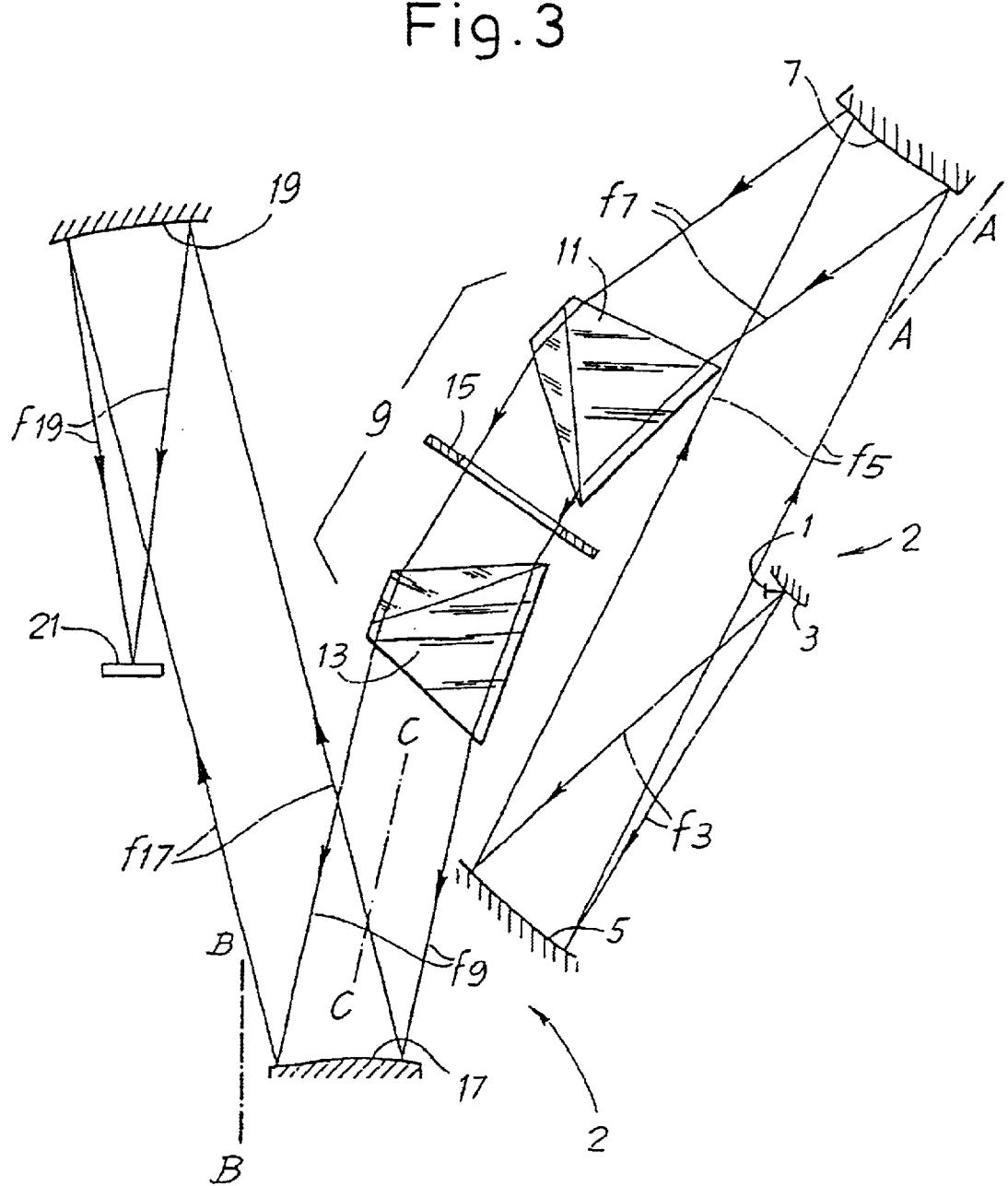
FIG. 3 is a first alternative coplanar configuration embodiment of a prism spectrometer according to the invention, the said configurations using exclusively aspherical correction mirrors.

FIG. 3 shows a first possible embodiment of the spectrometer according to the present invention, indicated as a whole by 2. Along the optical path of the incoming beams or incoming entry optics, the spectrometer has a beam-entry slit 1 which extends orthogonally to the plane of the figure. Through this slit there penetrate beams coming from a beam-entry optical device, which does not form part of the spectrometer and is not shown. Said optical device has characteristics which can vary according to the specific application for which the spectrometer is designed. The incoming beam or the incoming entry optics beam passing through the slit 1 encounters a first divergent spherical mirror 3, which has the function of correcting the curvature of field and the curvature of slit (smile). The beam reflected by the mirror 3 (beam F3) then encounters a, convergent spherical mirror 5, which constitutes the mirror of a Schmidt objective which forms the collimator of the spectrometer. The collimated beam F5, reflected by the spherical mirror 5, then encounters an aspherical corrector mirror for correction of axial and extra-axial spherical aberration.

The system made up of the divergent spherical mirror 3, the convergent spherical mirror 5, and the aspherical corrector mirror 7, which as a whole forms the collimator of the spectrometer 2, constitutes a so-called Schmidt-Cassegrain objective with mirror corrector. The optical axis of this system is the axis A—A. It is therefore an off-axis objective or off-axis system.

The beam F7, which is collimated and geometrically corrected by means of the mirror 7, passes through a dispersing system, designated as a whole by 9 and comprising, in this example of embodiment, a pair of prisms 11 and 13, between which there is set an aperture diaphragm 15. The two prisms 11, 13 are identical and set specularly with respect to the plane of the aperture diaphragm 15. Each of the two prisms 11, 13 is made up in this case of two optical wedges made of different materials. However, these characteristics are not binding for the purposes of the present invention. It is possible to make a wide-band spectrometer using a greater number of prisms, or else a single prism. In addition, it is not necessary for the prisms to be identical and set in a specular manner, or for them to be made of different materials. They may also be replaced by other dispersing elements. This applies also with reference to the subsequent examples of embodiment.

In FIG. 3, the prisms 11, 13 are arranged in such a way that the radiation is deviated by the prisms themselves so as to converge towards the axis A—A of the Schmidt-Cassegrain collimation objective 3–7. In what follows, this configuration will be referred to, for reasons of brevity, as "converging prisms".

The dispersed beam F9 leaving the disperser 9 then enters the focusing system, which comprises an aspherical correction mirror 17 that reflects the beam F17 towards a convergent spherical mirror 19, from which the focused beam F19 reaches a detector 21. The aspherical correction mirror 17 and the convergent spherical mirror 19 make up a Schmidt objective, of which the correction mirror 17 corrects the geometrical aberrations, except for the curvature of field. The latter is appropriately corrected directly, upon beam entry, by the divergent spherical mirror 3, the negative power of which is chosen in such a way as to eliminate the curvature of field of the two objectives (collimator and focusing system).

In this example of embodiment and in the ones that will be described in what follows, the axes of the various beams lie on one and the same plane, but this is not indispensable. In fact, starting from the configuration of FIG. 3, it is possible to obtain infinite variants of the arrangement of the components of the system simply by rotating the objective of the focusing system (aspherical mirror 17 and spherical mirror 19) about an axis C—C. This axis C—C coincides with the direction of the principal centre-band axial ray emerging from the dispersor 9.

Figure 4:
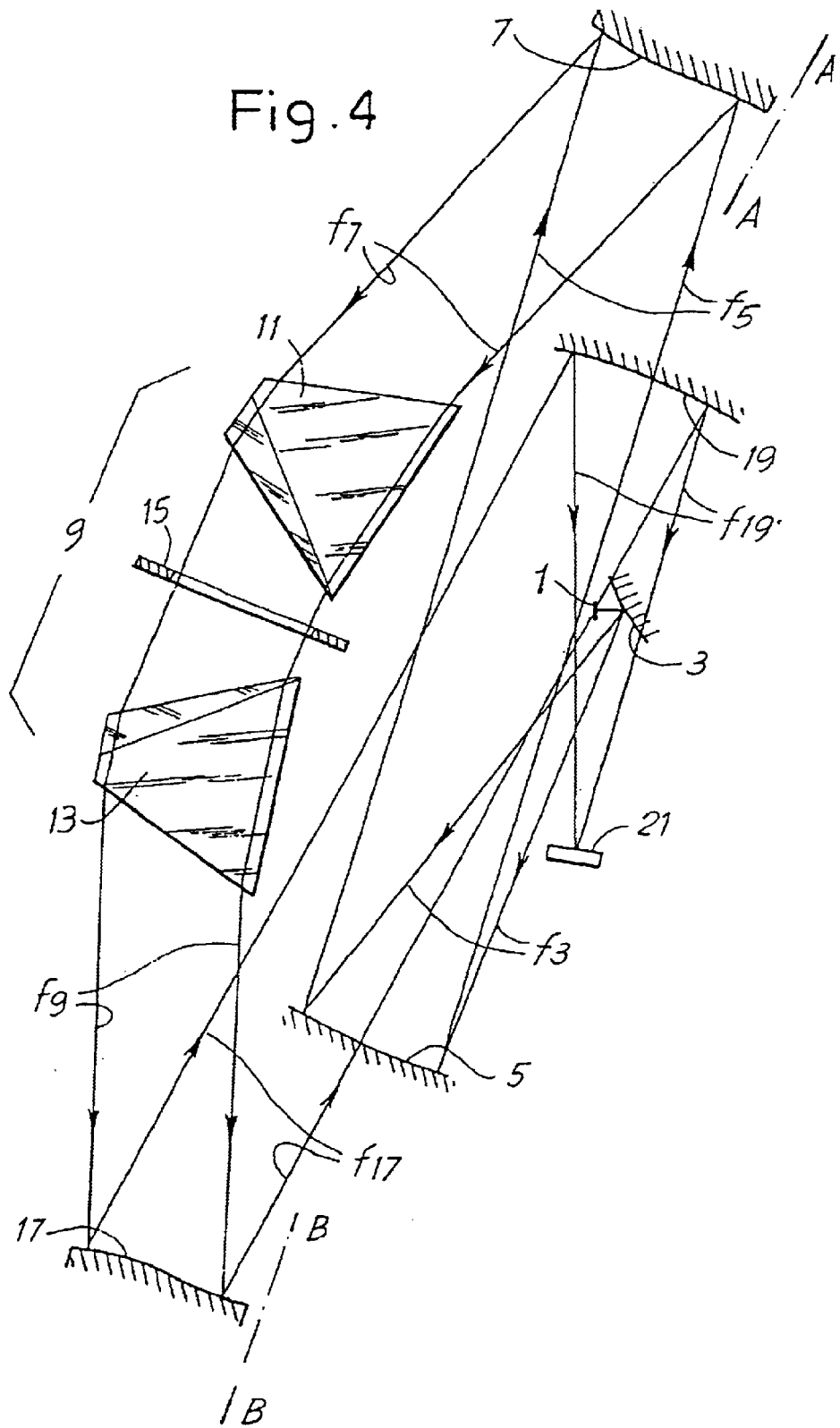
FIG. 4 is a second alternative coplanar configuration embodiment of a prism spectrometer according to the invention, the said configuration using exclusively aspherical correction mirrors.

FIG. 4 illustrates a different configuration of the spectrometer according to the invention. The same reference numbers indicate parts that are the same as, or parts corresponding to, those of FIG. 3. Also in this case, the arrangement is with converging prisms. The interference of the beams F3 and F19, which may be seen in FIG. 4, can be eliminated by using appropriate bending mirrors, thus obtaining an extremely compact spectrometer.

Figure 5:
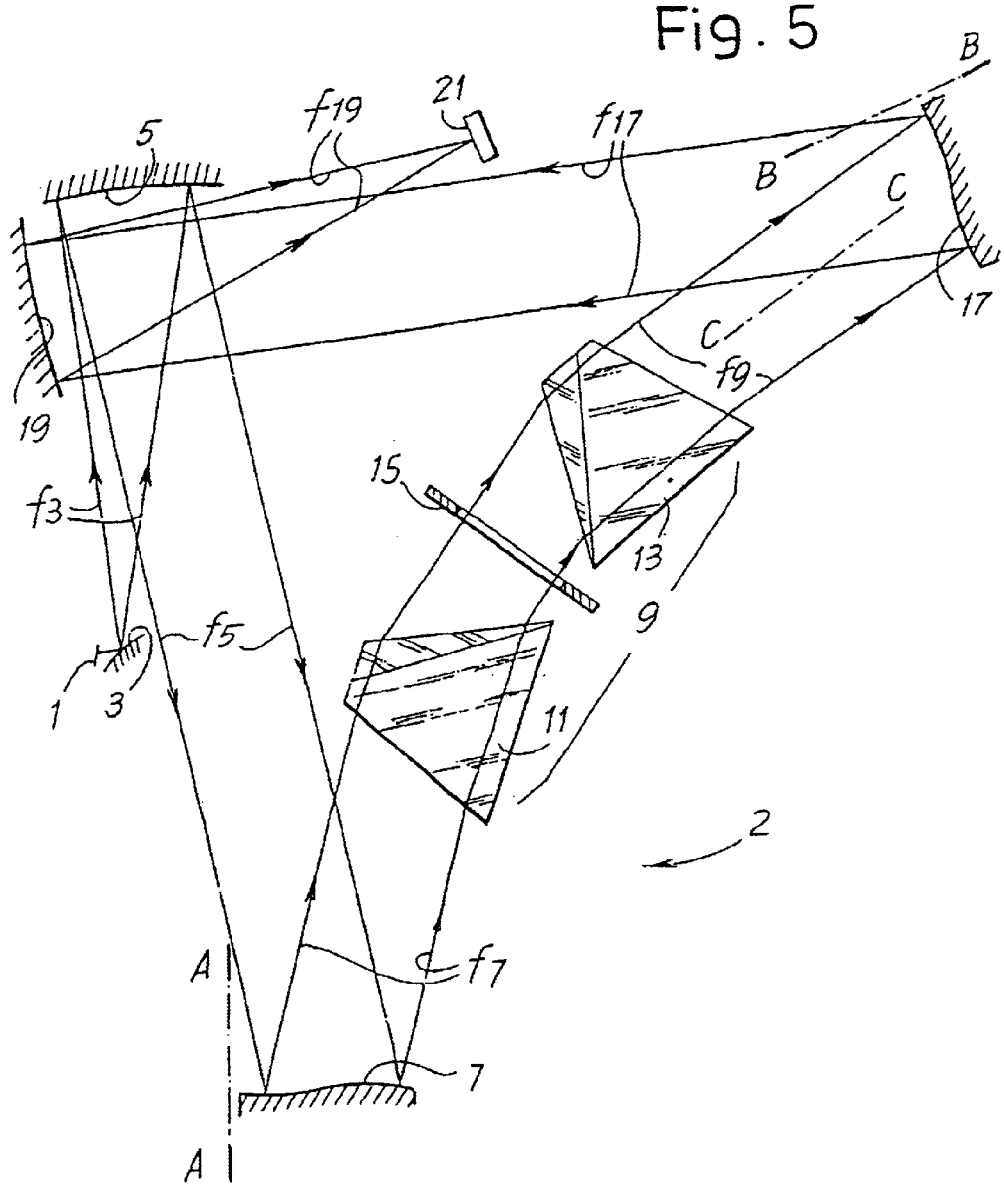
FIG. 5 is a third alternative coplanar configuration embodiment of a prism spectrometer according to the invention, the said configuration using exclusively aspherical correction mirrors.

FIG. 5 illustrates a third embodiment of the spectrometer according to the invention, in which parts that are the same or that correspond are again designated by the same reference numbers as those adopted in FIGS. 3 and 4. The arrangement is with "diverging prisms", i.e., with the beam emerging from the dispersor 9 which diverges with respect to the axis A—A of the Schmidt-Cassegrain objective that forms the collimator.

Figure 6:
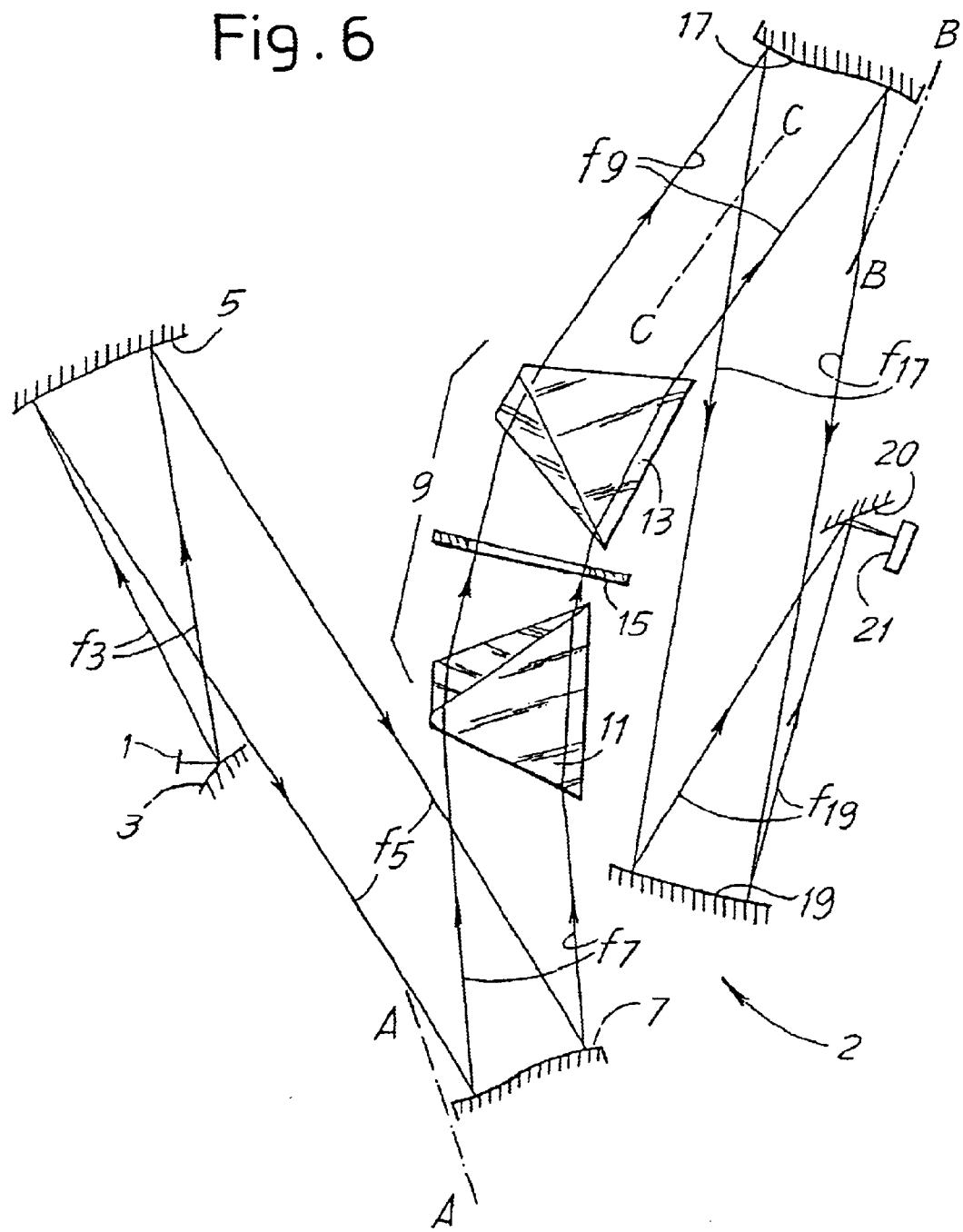
FIG. 6 is a fourth alternative coplanar configuration embodiment of a prism spectrometer according to the invention, the said configuration using exclusively aspherical correction mirrors.

FIG. 6 shows a further embodiment with diverging prisms. Identical reference numbers again designate parts that are the same as, or that correspond to, those of the previous examples of embodiment. In this case, the focused beam F19 is bent by a bending mirror 20 before reaching the detector 21.

For all the configurations described above, once the angle of rotation of the focusing objective about the axis C—C has been fixed, the curvature of field and curvature of slit, or smile, can be simultaneously corrected using a single divergent spherical mirror 3 appropriately inclined with respect to the plane that contains the beam-entry slit 1.

In addition, if it is considered that the systems making up the focusing objective and the collimator have the same aberrations, these may be cancelled out by means of an appropriate choice of the configuration of the prisms, of the focal lengths of the objectives, and of the angle of rotation about the axis C—C. In this case, if there do not exist any geometrical constraints or constraints of some other nature that militate against or prevent the choice of this particular arrangement, a compensation is obtained of the curvature of field and of the curvature of slit even without the divergent spherical mirror 3.

Using dispersors other than prisms, such as diffraction gratings, gratings and prisms, grisms, grisms and gratings, grisms plus prisms, and grisms plus gratings and prisms, considerations that are altogether analogous to those made previously as regards prism spectrometers apply.

FIG. 7 shows the optical scheme of an example of embodiment of the spectrometer, which uses a diffraction grating in reflection, which is designated by 9R and which replaces the disperser 9 consisting of prisms 11, 13 of the examples of FIGS. 3 to 6. The remaining components are designated by the same reference numbers as the ones used in the previous figures. For reasons of simplicity of the drawing, the divergent spherical mirror 3 between the slit 1 and the convergent mirror 5 of the collimator is omitted.

The scheme can be rendered even more compact by using a single aspherical correction mirror for the collimator and the focusing system, and by providing the diffraction grating on the correction mirror itself. This embodiment is represented in FIG. 8.

Figure 9:
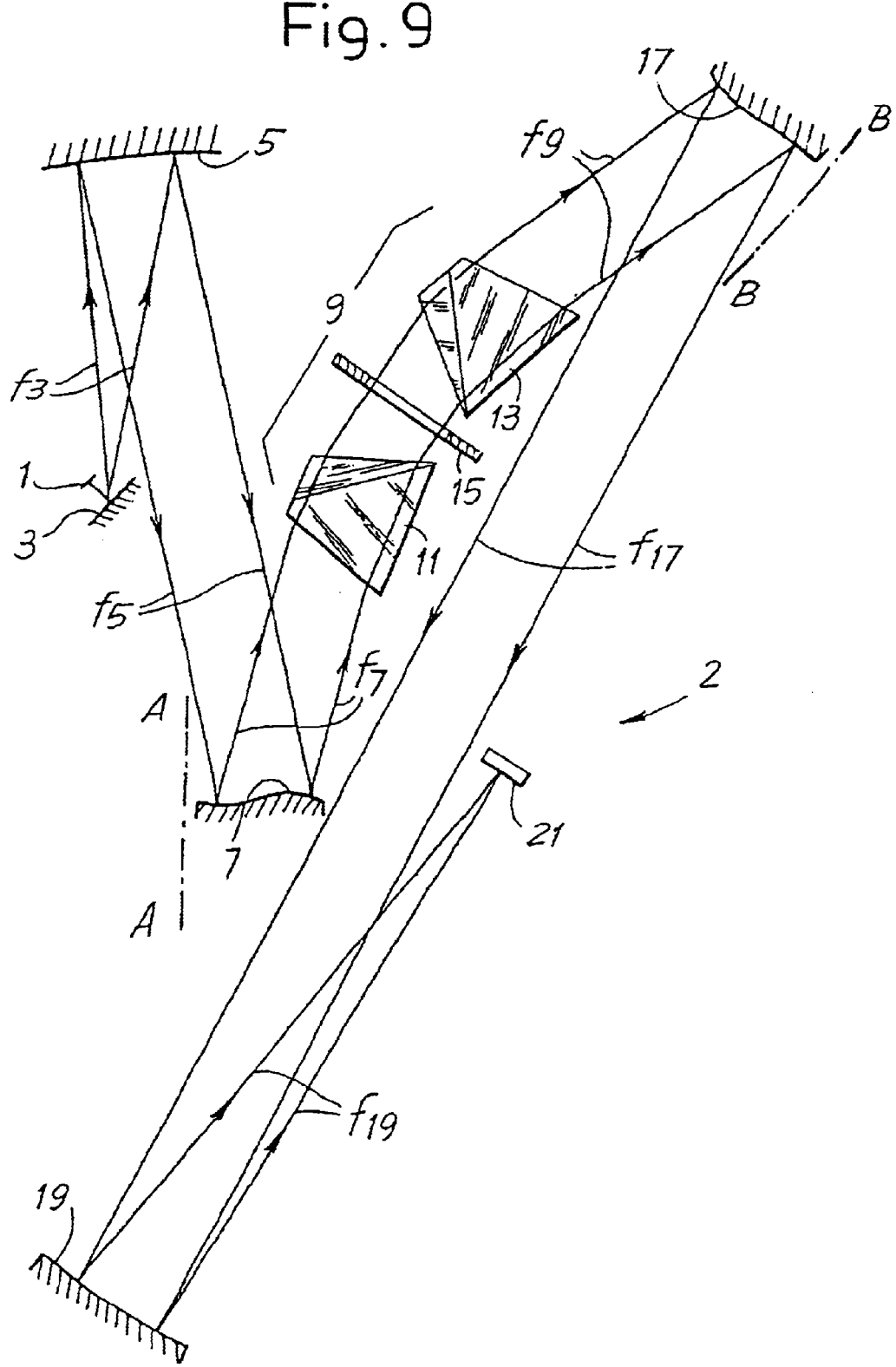
FIG. 9 is an illustration of a configuration of the spectrometer with focusing system and collimator of different focal lengths.

It is possible to devise configurations in which the spectrometer works with a magnification different from unit magnification, by diversifying the focal lengths of the collimator and of the focusing system. In this case, there are no particular pointers to be followed, and the same considerations presented previously apply. An example of embodiment of this type is illustrated in FIG. 9, where identical reference numbers again designate parts that are the same as, or correspond to, those of the example of FIG. 3. Also in this case, it is possible to correct both the curvature of field and the smile with a single divergent spherical mirror 3 set close to the beam-entry slit 1. The optical scheme of FIG. 9 corresponds to a prism spectrometer that works with a 2× magnification.

The embodiments so far described employ exclusively reflecting elements for correcting geometrical aberration. In particular, both in the collimator and in the focusing system, aspherical mirrors 7 and 17 are used for correcting the axial and extra-axial spherical aberration. The use of these components makes it possible to prevent introduction of chromatic aberration and to obtain a particularly advantageous device in terms of resistance to radiation and extension of the chromatic band.

Figure 10:
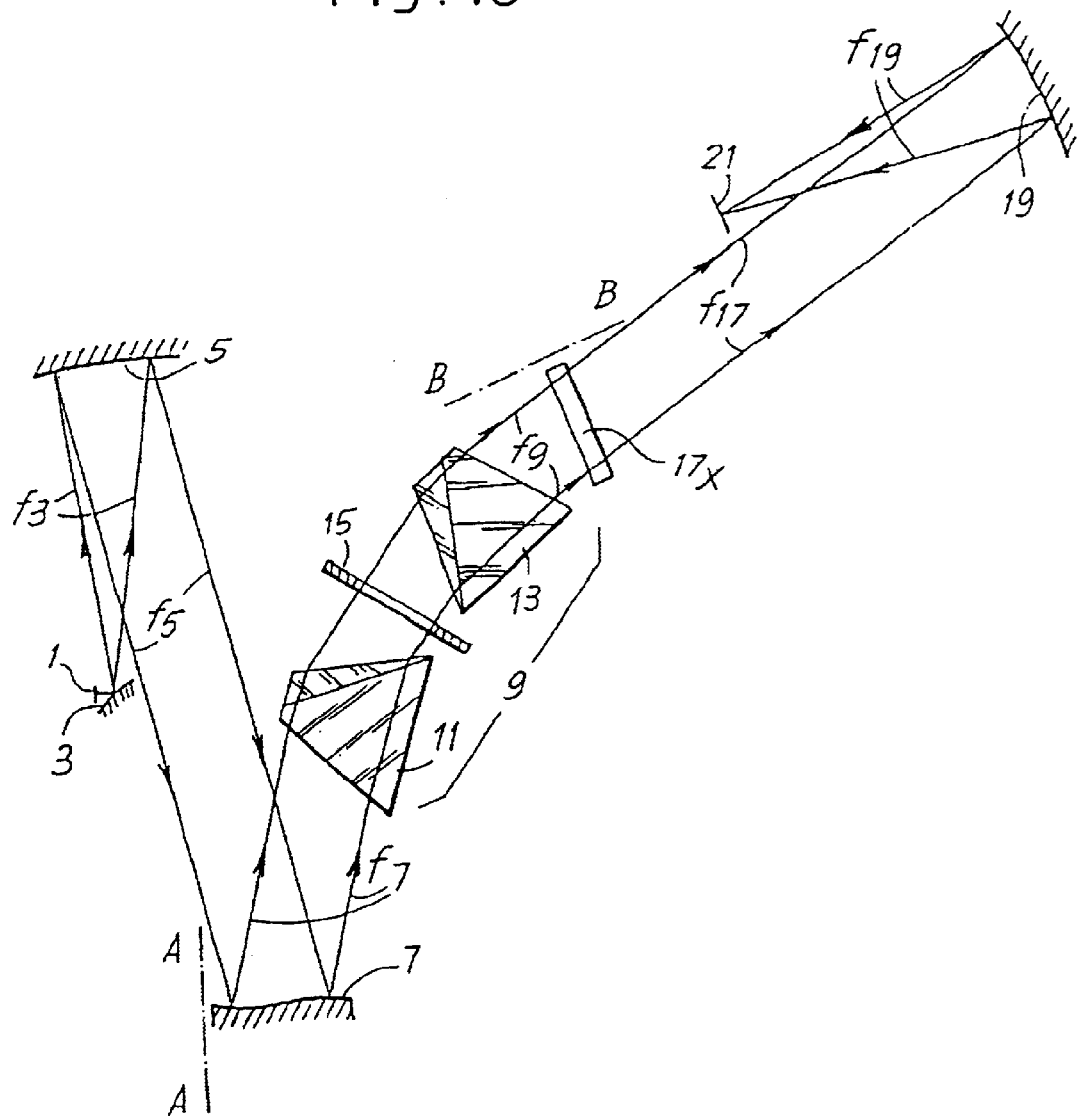
FIG. 10 is an embodiment of the spectrometer that uses a Schmidt plate in transmission and a correction mirror.

However, if this dual advantage is in part forgone, it is possible to make spectrometers in which one of the aspherical mirror correctors is replaced by a dioptric Schmidt plate, i.e., one in transmission. An example of embodiment of a spectrometer of this type is illustrated in FIG. 10, in which identical reference numbers designate parts that are the same as, or correspond to, those of the foregoing examples of embodiment. The aspherical corrector mirror 17 is replaced by a dioptric Schmidt plate, designated by 17x.

Consequently, in this case the Schmidt plate is used on the focusing system, whereas on the collimator there is still used an aspherical corrector mirror 7. Spectrometers that have a corrector mirror on the focusing system and a dioptric Schmidt plate on the collimator are similar to the ones illustrated in FIG. 10 if the position of the slit and of the corrector mirror is inverted with the position of the detector.

Figure 11:
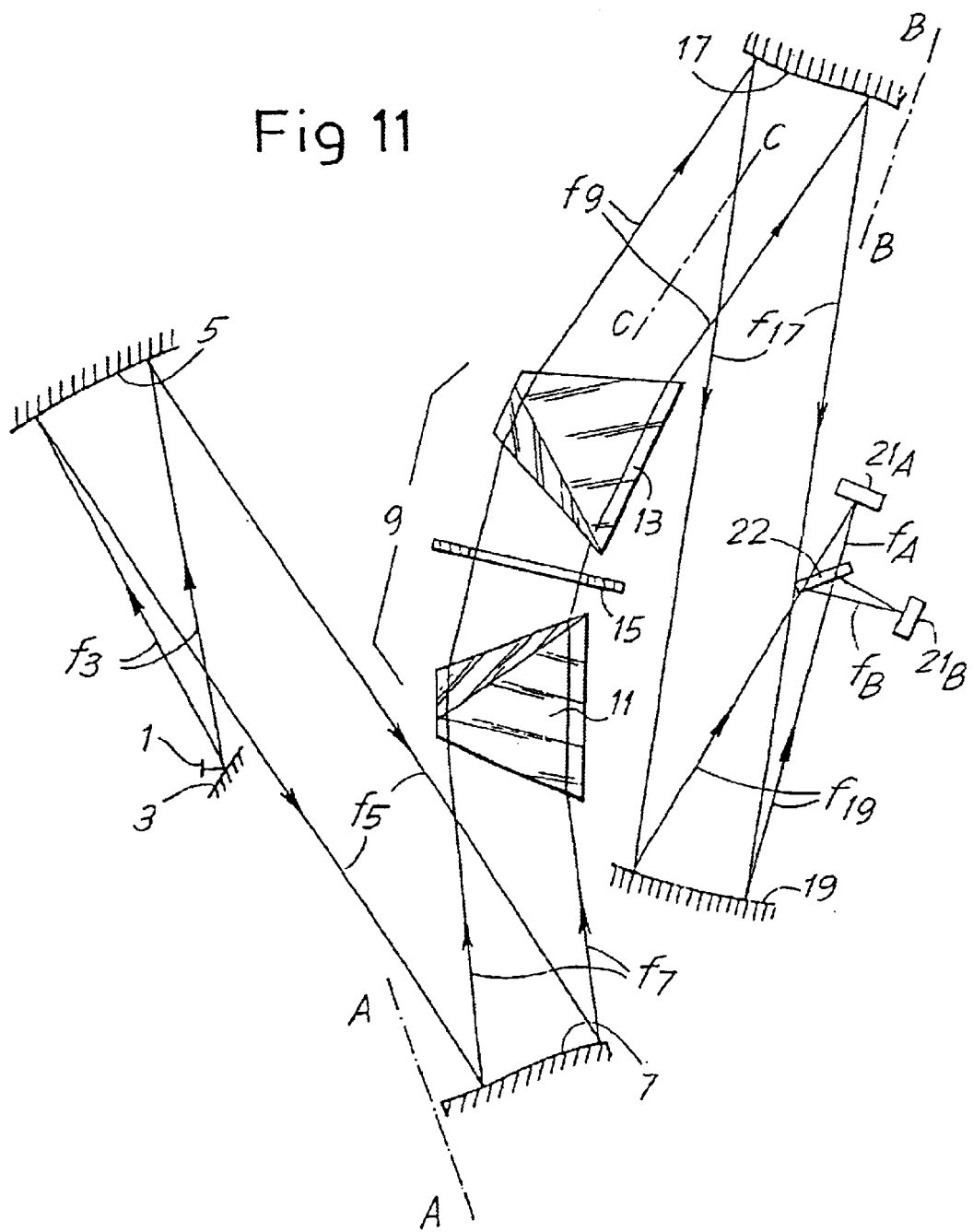
FIG. 11 is a first embodiments of the spectrometer with two spectral bands separated by a beam splitter.

According to a further improvement of the present invention, it is possible to envisage the construction of a spectrometer with splitting into two or more spectral bands and the consequent formation of a second optical path. FIG. 11 illustrates a first possible embodiment of a spectrometer of this type. The arrangement of the optical components is similar to that of FIG. 6. The reference number 1 designates the beam-entry slit, 3 designates the divergent spherical mirror for correcting the smile and the curvature of field, 5 designates the convergent spherical mirror of the collimator, 7 designates the aspherical mirror for correcting the spherical aberration, 9 designates the disperser comprising the prisms 11, 13 between which the diaphragm 15 is set, 17 designates the second aspherical correction mirror, and 19 designates the convergent spherical mirror of the focusing system. The beam F19 emerging from the convergent spherical mirror 19 is split by a beam splitter, consisting of a dichroic mirror 22, into two beams FA and FB, one of which follows the prolongation of the optical path so far described until it reaches the detector 21A, whilst the other reaches a second detector 21B, following a second optical path, which, in this example of embodiment, develops from the beam splitter 22 to the second detector 21B, In this example of embodiment, all the components of the collimator, disperser and focusing system are in common for all the bands, and splitting is obtained by means of the dichroic mirror (beam splitter) 22 downstream of the focusing system.

Figure 12:
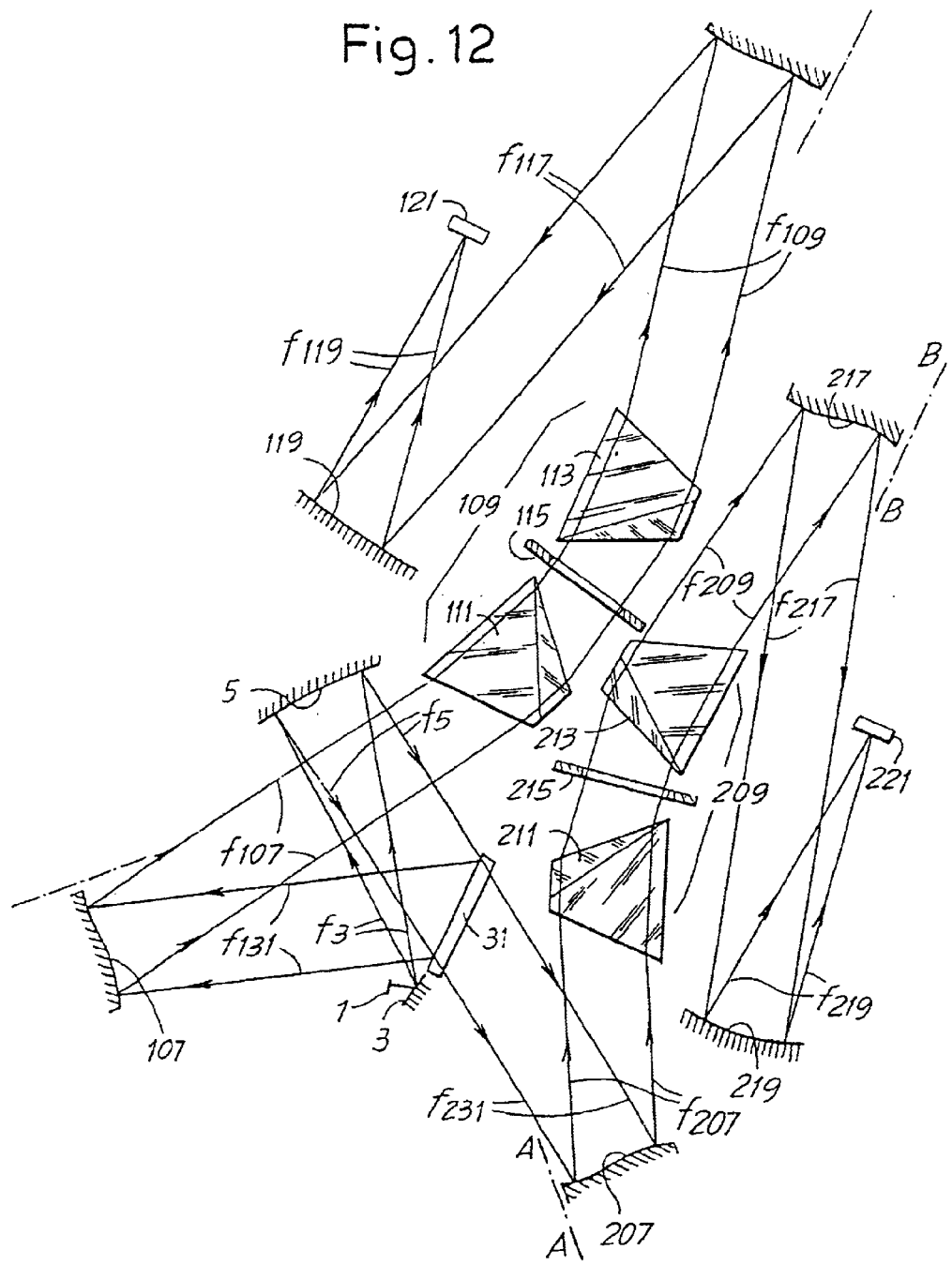
FIG. 12 is a second embodiment of the spectrometer with two spectral bands separated by a beam splitter.

FIG. 12 shows an embodiment in which the splitting of the incoming beam into separate beams for the different wavebands takes place upstream of the dispersor. The beam enters the spectrometer through the beam-entry slit 1 and reaches the divergent spherical mirror 3 for correction of the smile and of the curvature of field. The beam F3, reflected by the mirror 3, reaches the first convergent spherical mirror 5 of the collimator, and the collimated beam F5 is then split into two beams by a dichroic mirror or dichroic beam splitter 31. From this point onwards, two separate paths are envisaged for the two beams split by the beam splitter 31. The elements of the two paths which are equivalent to the corresponding elements of the previous examples of embodiment are designated by the same reference numbers, except that each number is incremented by 100 and 200, respectively for each path. The beams coming from the dichroic mirror 31 are designated by F131 and F231, the beam F131 being the one reflected by the mirror 31, and the beam F231 being the one that traverses the mirror 31.

Along the first optical path, the following are arranged: a first aspherical corrector mirror 107, from which the beam F107 is reflected towards a dispersor 109; two prisms 111, 113, which form the dispersor 109 and between which a diaphragm 115 is set; an aspherical corrector mirror 117; a convergent spherical mirror 119; and a detector 121. The aspherical mirror 107 forms, with the spherical mirror 5, the objective of the collimator, whilst the aspherical mirror 117, with the spherical mirror 119, forms the objective of the focusing system. The beam emerging from the disperser 109 is designated by F109, whilst the beam reflected by the aspherical corrector mirror 117 is designated by F117, and the focused beam directed by the mirror 119 towards the detector 121 is designated by 119.

The beam F231 encounters components along a second optical path which are equivalent to the ones described previously, namely, a first aspherical corrector mirror 207, by which the beam F207 is reflected towards a dispersor 209, two prisms 211, 213 which form the disperser 209 and between which a diaphragm 215 is set, an aspherical corrector mirror 217, a convergent spherical mirror 219, and a detector 221. The aspherical mirror 207 forms, together with the spherical mirror 5, the objective of the collimator, whilst the aspherical mirror 217, together with the spherical mirror 219, forms the objective of the focusing system. The beam emerging from the dispersor 209 is designated by F209, whilst the beam reflected by the aspherical corrector mirror 217 is designated by F217, and the focused beam directed by the mirror 219 towards the detector 221 is designated by F219. More advantageously, it is possible to use a single collimator 5 with a single aspherical corrector mirror 207 by inserting the dichroic beam splitter 31 between the aspherical corrector mirror 207 and the dispersor 209.

In the example of FIG. 12, two paths that are substantially the same are represented for the two beams downstream of the dichroic mirror 31. However, since splitting of the beam is envisaged upstream of the dispersor, it is clear that the latter can be configured in different ways in the two paths. In other words, the dispersors 109 and 209 can be built using different materials and/or components, which are optimized according to the wavebands of the two beams that traverse them. The dispersors to be used in the different bands may comprise, for instance, prisms, gratings, grisms, prisms and gratings, prisms and grisms, and prisms plus grisms and gratings.

In this case, to correct the curvature of field and the smile it may be necessary to use secondary spherical mirrors set in the vicinity of the detectors 121 and 221.

The configuration of FIG. 12 is particularly useful when the two spectral bands into which the incoming beam is to be split are incompatible, i.e., they cannot traverse the same material. This occurs in the case, for example of a spectral band in the infrared range and a spectral band in the visible-light range. In such a case, the materials of which the prisms are made must be different for the two spectral channels, in so far as materials that are transparent for IR radiation are not transparent for visible radiation and vice versa, or else they are transparent with levels of absorption that are unacceptable for this type of application.

Figure 13:
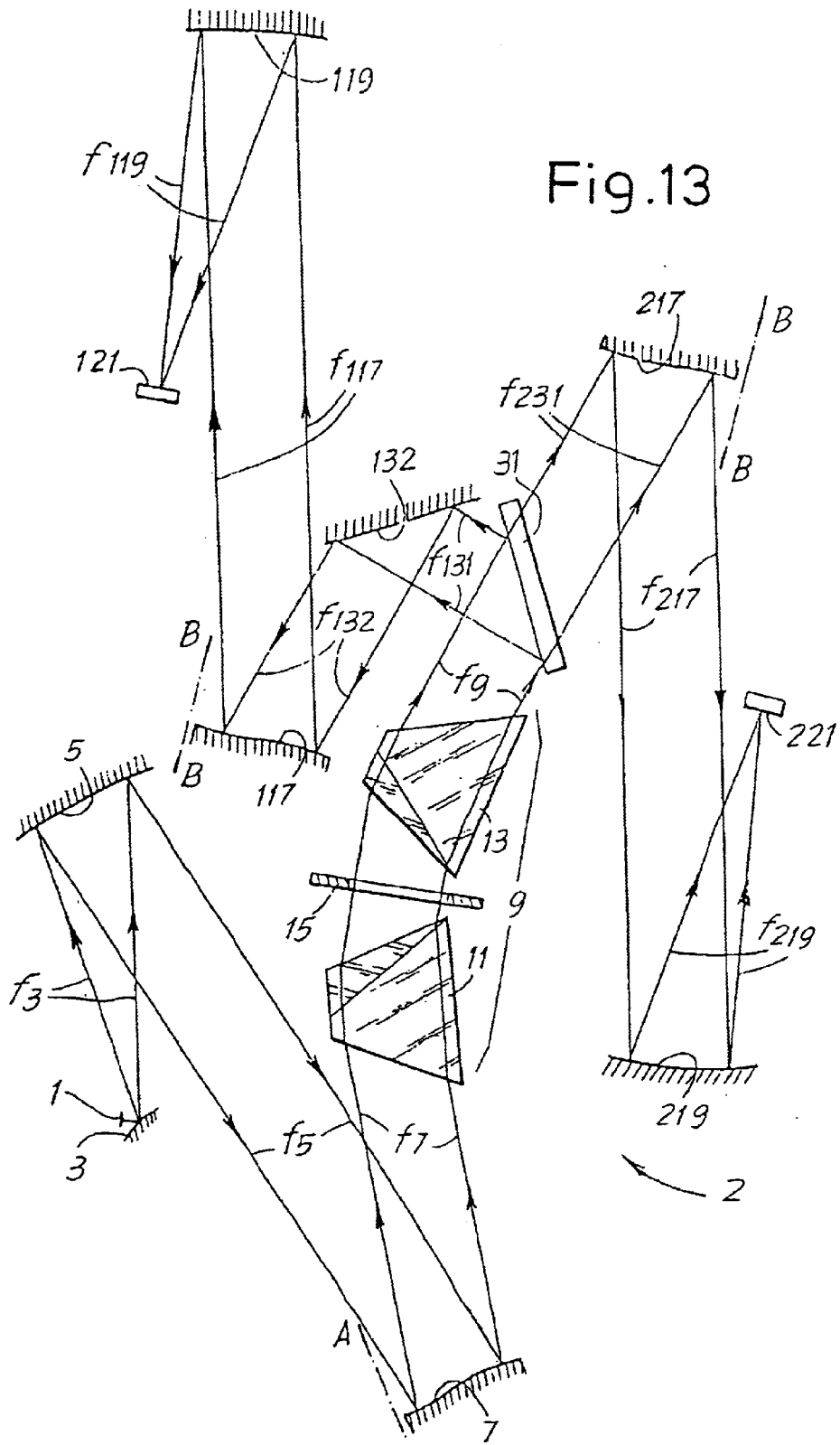
FIG. 13 is a third embodiment of the spectrometer with two spectral bands separated by a beam splitter.

FIG. 13 shows an embodiment in which the beam is split by a dichroic mirror or beam splitter set downstream of the disperser. In this case, the collimator and the dispersor are in common for the two channels of the spectrometer, whilst the focusing systems are separate and distinct for each band into which the beam is split by the dichroic mirror. Up to the dichroic mirror, again designated by 31, the components are designated by the same reference numbers as those used in FIGS. 3 to 6, whilst for the components downstream of the dichroic mirror 31 the same reference numbers are adopted as those used for the configuration of FIG. 12. The incoming beam passing through the beam-entry slit 1 encounters the divergent spherical mirror 3 for correction of the smile and of the curvature of field; next, after being reflected (beam F3) by the mirror 3, it reaches the convergent spherical mirror 5, is reflected (beam F5) in the direction of the aspherical corrector mirror 7, and from the latter is reflected (beam F7) towards the disperser 9 with the prisms 11, 13 and the diaphragm 15. The beam F9 emerging from the dispersor 9 is split, by the beam splitter 31, into two beams F131 and F231. The beam F131 is bent by a plane bending mirror 132 towards the aspherical corrector mirror 117, and from the latter reaches (beam F117) the convergent spherical mirror 119 of the focusing system, to be focused (beam F119) onto the detector 121.

The beam F231 reaches the aspherical corrector mirror 217 directly, and the beam reflected by the latter (beam F217) reaches the convergent spherical mirror 219 of the focusing system. The focused beam F219 then reaches the second detector 221. The optical axes of the two focusing systems are again designated by A—A and B—B.

Figure 14:
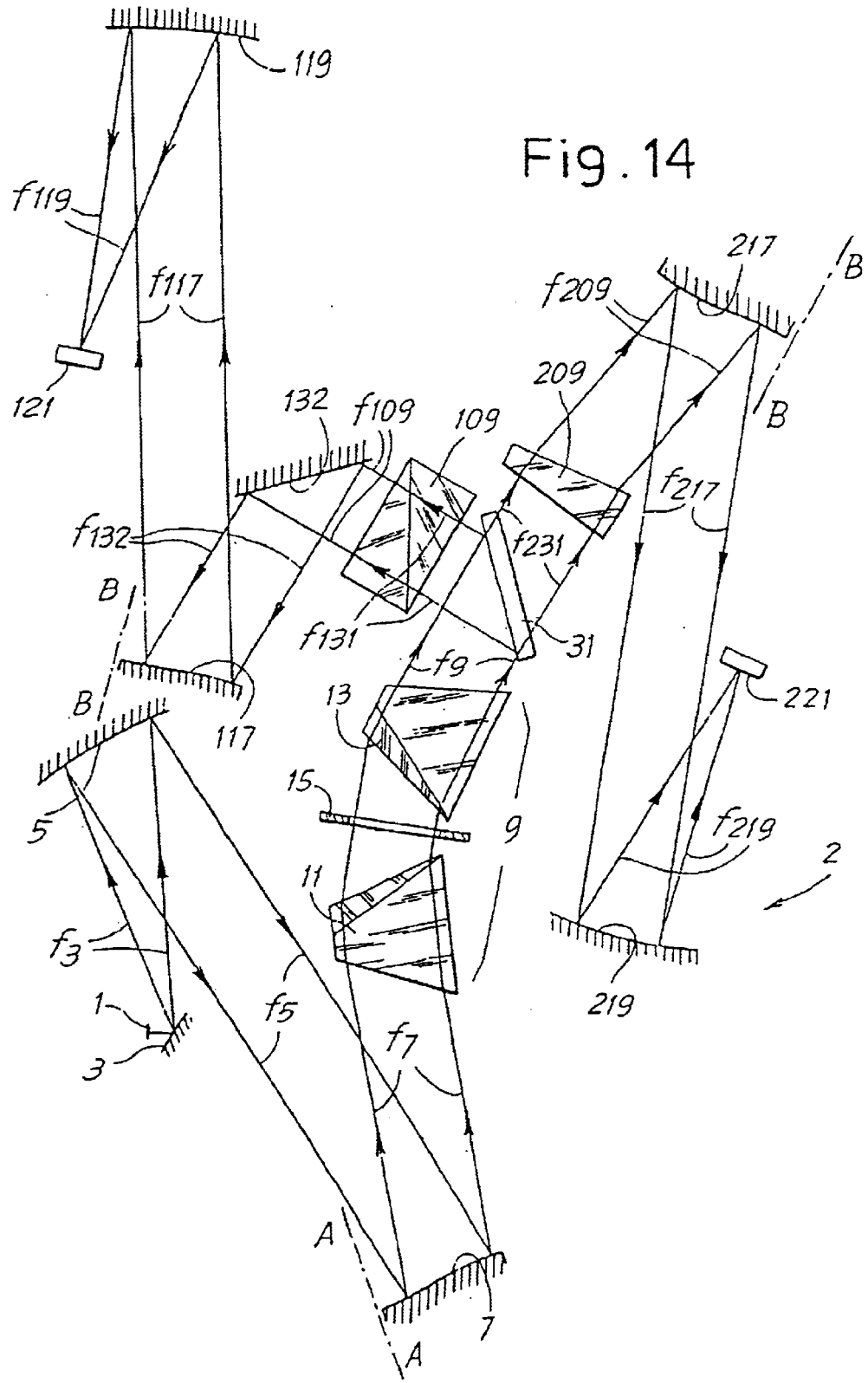
FIG. 14 is a fourth embodiment of the spectrometer with two spectral bands separated by a beam splitter.

FIG. 14 shows a different embodiment, in which the following are present: a pre-dispersor, a beam splitter, and auxiliary dispersors which are different for each band. The reference number 1 designates the beam-entry slit, and 3 the divergent spherical mirror for correction of the curvature of field and of the smile. The beam (F3) reflected by the mirror 3 reaches the convergent spherical mirror 5 of the collimator. The collimated beam F5 reaches the aspherical corrector mirror 7 for correction of spherical aberration, and the beam F7 reflected by the corrector mirror 7 traverses the dispersor 9 comprising the prisms 11, 13, the said disperser 9 in this case operating as a pre-dispersor. The beam F9 emerging from the pre-dispersor 9 is split by the dichroic mirror 31 into two beams F131 and F231. The beam F131 traverses an auxiliary dispersor 109, and the beam F109 emerging from said auxiliary disperser is reflected by a plane bending mirror 132 and reaches the aspherical corrector mirror 117. The beam F117 reflected by the mirror 117 reaches the convergent spherical mirror 119 of the focusing system, and the focused beam F119 reaches the first detector 121.

In the second spectral channel, the beam F231, which traverses the beam splitter 31, reaches a respective auxiliary dispersor 209. The dispersed beam F209 then reaches the aspherical corrector mirror 217, from which the beam F217 is sent towards the convergent spherical mirror 219 of the focusing system. The focused beam F219 is sent towards the second detector 221.

In the examples of embodiment described with reference to FIGS. 11 to 14, correction of spherical aberration is obtained using an aspherical mirror (7) in the collimator and an aspherical mirror (17; 117; 217) in each spectral channel in the focusing system. However, spherical aberration can also be corrected otherwise. For example, FIG. 15 shows a configuration of a band-splitting spectrometer with an aspherical corrector mirror in the collimator and a dioptric Schmidt plate, which has also the function of beam splitter, set downstream of the disperser.

Figure 15:
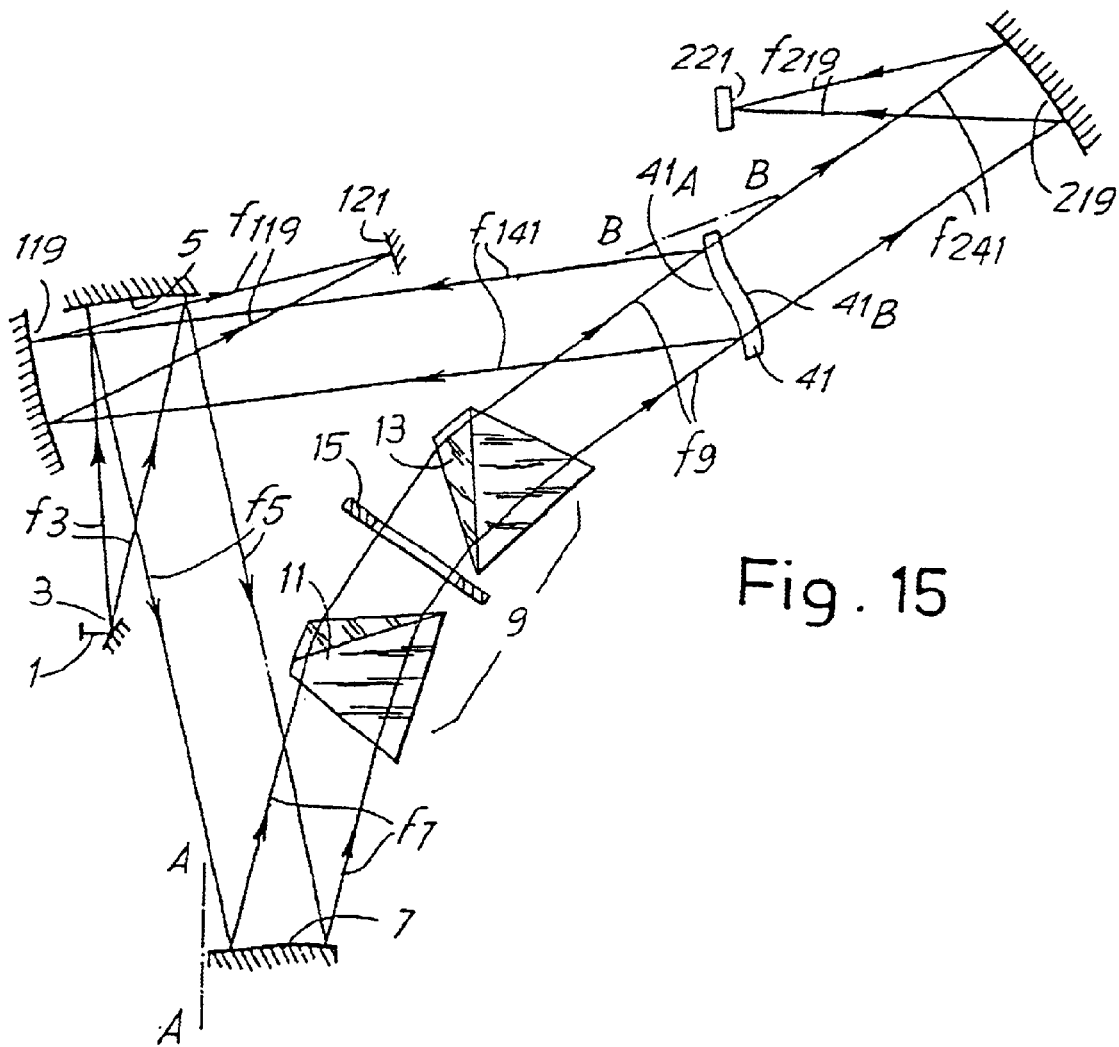
FIG. 15 is a fifth embodiment of the spectrometer with two spectral bands separated by a beam splitter.

More in particular, the spectrometer of FIG. 15 comprises a beam-entry slit 1, associated to which is a divergent spherical mirror 3 for correction of the smile and of the curvature of field. The beam is collimated by a convergent spherical mirror 5 of the collimator, and the collimated beam F5 reaches an aspherical corrector mirror 7. As in the previous examples, the components 3, 5, 7 form an off-axis Schmidt-Cassegrain objective, the optical axis of which is designated by A—A.

The beam F7 coming from the aspherical mirror 7 traverses the dispersor 9, which, in this case is represented as a prismatic dispersor with the prisms 11, 13. The beam F9 emerging from the disperser 9 reaches a Schmidt plate 41 with two aspherical faces that are different from one another, designated by 41A and 41B. The aspherical face 41A has undergone treatment so that it functions as a beam splitter and acts both as a Schmidt corrector in reflection, i.e., as an aspherical corrector mirror like the aspherical corrector mirrors 17, 117, 217 of the previous examples of embodiment, and as a dichroic mirror or beam splitter. The beam F141, reflected by the dichroic-mirror surface 41A of the Schmidt plate 41, reaches the convergent spherical mirror 119 of the focusing system, and the focused beam F119 reaches the detector 121.

The frequency band that is not reflected by the dichroic surface 41A of the plate 41 traverses the plate and comes out from the surface 41B. For this portion of beam, the plate 41 behaves like a dioptric Schmidt plate, i.e., in transmission. The aspherical surface 41B of the plate 41 has a profile which, on the one hand, compensates the effect of the surface 41A, which has an effect of its own on the incoming beam, and, on the other hand, corrects the spherical aberration of the beam that traverses the plate 41. The latter beam, designated by F241, reaches a convergent spherical mirror 219 and is focused (beam F219) onto the second detector 221.

Therefore, basically, the plate 41 performs three functions simultaneously:
dichroic splitting of the beam (beam splitter) for separation of the two spectral channels;
correction of spherical aberration as aspherical mirror (surface 41A), for a first spectral channel; and
correction of spherical aberration as dichroic Schmidt plate (surface 41B) for the second spectral channel.

The single plate 41 can also be replaced by two distinct plates set in series, one of which (the one upstream with respect to the direction of propagation of the passing beam) has an aspherical surface that has undergone dichroic treatment on the beam-entry side, and an opposite plane surface, whilst the second plate has a plane beam-entry surface and an aspherical beam-exit surface.

A modification of this configuration is obtained by setting the plate 41 upstream of the dispersor and providing two dispersors, one for each spectral channel.

A further embodiment envisages the replacement of the dispersor 9 of FIG. 15 with a grating provided directly on the plate 41 or on one of the two plates which, in combination, perform the functions of the plate 41. In this case, the plate 41 has a first face which has undergone dichroic treatment and which acts as a beam splitter or dichroic mirror for splitting the beam into two spectral bands. Said face, which is aspherical, also acts as an aspherical corrector mirror for the focusing system of the first spectral channel. The second face of the plate, which is traversed by the radiation of the second band resulting from the splitting of the incoming beam performed by the dichroic surface, is also an aspherical surface which completely compensates the spherical aberration of the focusing system of the second spectral channel, besides compensating the effect of the asphericity of the first face. Also provided on the first face is a diffraction grating which acts in reflection and/or in transmission. In this case, the plate works simultaneously as:
beam splitter;
corrector of the focusing system of the first spectral channel;
corrector of the focusing system of the second spectral channel; and
dispersive element in transmission and/or reflection.

The grating can be provided also on the second face of the plate (i.e., the one that has not been dichroically treated) and functions as a dispersor for the band of radiation transmitted.

As an alternative to the dioptric Schmidt plate, it is possible to use (even though this is less convenient) a cube which presents asphericity on the two faces that are traversed by the radiation.

Figure 16:
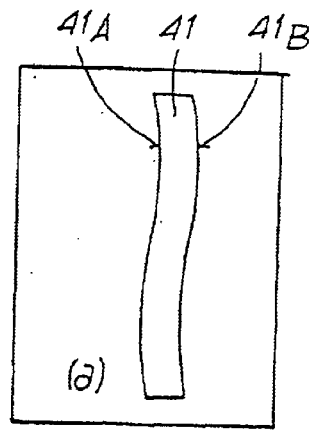
FIG. 16(A) is a schematic representations of an examples of aspherical beam splitters which act also as dispersor with a dioptric Schmidt plate having an aspherical profile first surface undergoing a dichroic treatment (beam splitter), and an aspherical profile second surface as used in the embodiment of FIG. 15.
FIG. 16(B) is a schematic representation of an aspherical beam splitter which also act as dispersor, wherein a dioptric Schmidt plate similar to the plate of 16A has a grating present on the aspherical profile surface.
FIG. 16(C) is a schematic representation of an aspherical beam splitter which also act as dispersor, made up of two paired optical prisms, the first prism having a beam entry surface with an aspherical profile and second prism having a beam exit surface with an aspherical profile.
Figure 16:
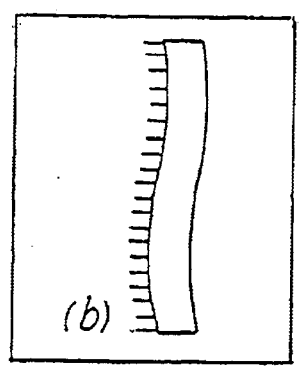
Figure 16:
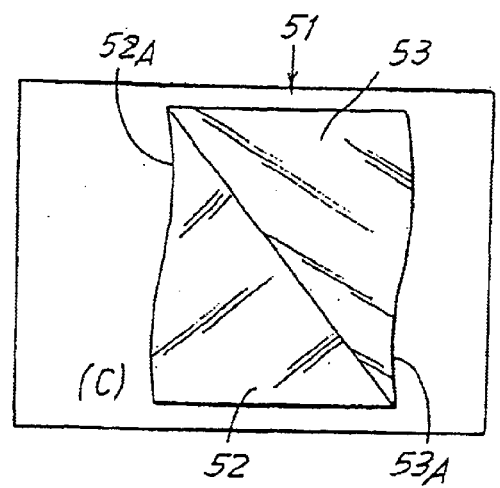

FIGS. 16(A) to 16(C) are schematic representations of the various configurations that the dioptric components previously considered may assume. In greater detail FIG. 16(A) represents a dioptric Schmidt plate 41 with a first surface 41A having an aspherical profile and having undergone the dichronic treatment (beam splitter), and a second face 41B having an aspherical profile. This is the plate used in the ion of FIG. 15.

FIG. 16(b) represents a dioptric Schmidt plate similar to the plate of FIG. 16(a), with the addition of a grating present on the aspherical-profile surface 41A.

FIG. 16(c) represents a cube 51 made up of two paired optical prisms 51 and 53. The prism 52 has a beam-entry surface 52A having an aspherical profile and having undergone dichroic treatment (beam splitter), whilst the beam-exit surface 53A of the prism 53 has an aspherical profile.

The level of performance of a spectrometer built according to the present invention is extremely high, both in terms of bandwidth and in terms of reduction of the spatial co-registration error and smile, as well as in terms of aperture and field of view. The presence of a reduced number, or even the total absence, of dioptric components reduces or eliminates the chromatic aberration of non-dispersive components. The use of Schmidt or Schmidt-Cassegrain objective reduces or eliminates axial and extra-axial spherical aberration.

As a demonstration of the high optical qualities of a spectrometer built according to the invention, FIGS. 17(A) to 17(I) present the spot diagrams for the configuration of FIG. 6. The nine boxes of FIG. 17(A) to FIG. 17(I) reproduce the spot diagrams obtained for three different wave lengths (namely 0.4; 1.45 and 2.5 $\mu$m) and in different points of the direction of developments of the slit, and more precisely, at the centre, at one end; and in an intermediate position. That is, said spot diagrams have been obtained by moving along the direction of chromatic dispersion (spectral direction) of the image picked up by the detector arid along the direction of development of the beam-entry slit (spatial direction).

Figure 17:
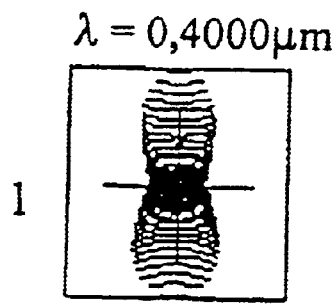
FIG. 17(A) is a spot diagram illustrating the optical quality of a spectrometer built according to the present invention obtained for 0.4 μm wave length.
FIG. 17(B) is a spot diagram illustrating the optical quality of a spectrometer built according to the present invention, obtained for 0.4 μm.
FIG. 17(C) is a spot diagram illustrating the optical quality of a spectrometer built according to the present invention, obtained for 0.4 μm.
FIG. 17(D) is a spot diagram illustrating the optical quality of a spectrometer built according to the present invention, obtained for 1.45 μm.
FIG. 17(E) is a spot diagram illustrating the optical quality of a spectrometer built according to the present invention, obtained for 1.45 μm wave length.
FIG. 17(F) is a spot diagram illustrating the optical quality of a spectrometer built according to the present invention, obtained for the wavelength of 1.45 μm.
FIG. 17(G) is a spot diagram illustrating the optical quality of a spectrometer built according to the present invention, obtained for the wave length of 2.5 μm.
FIG. 17(H) is a spot diagram illustrating the optical quality of a spectrometer built according to the present invention, obtained for the wave length of 2.5 μm.
FIG. 17(I) is a spot diagram illustrating the optical quality of a spectrometer built according to the present invention, obtained for the wave length of 2.5 μm.
Figure 17:
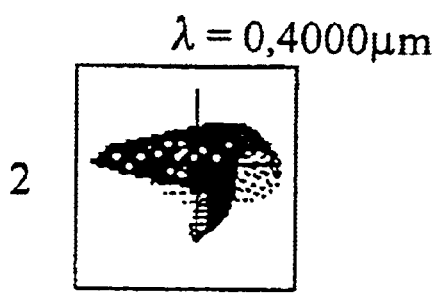
Figure 17:
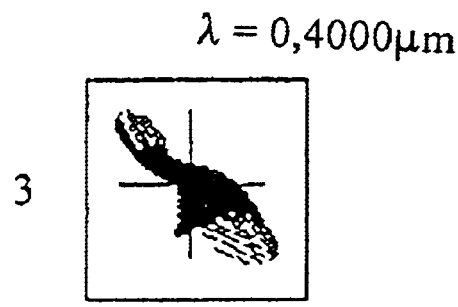
Figure 17:
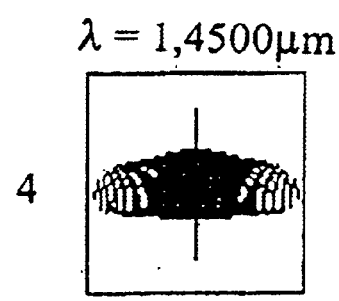
Figure 17:
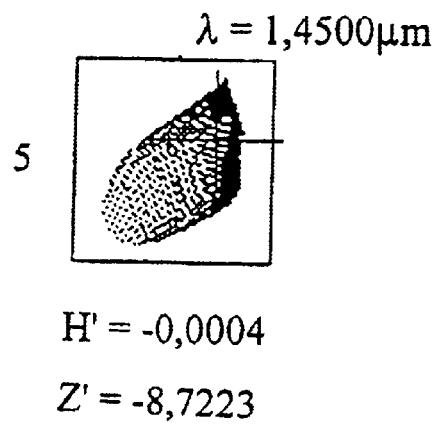
Figure 17:
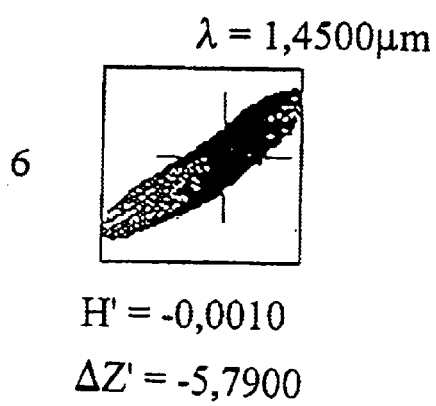
Figure 17:
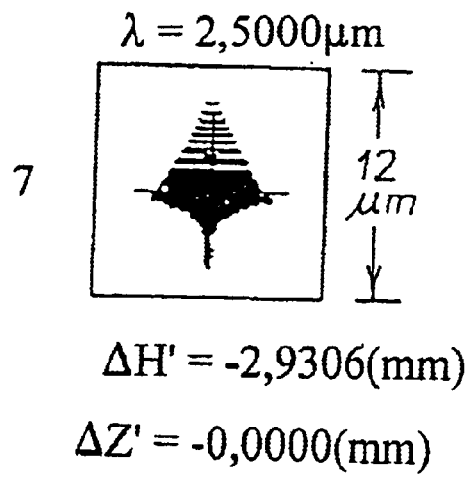
Figure 17:
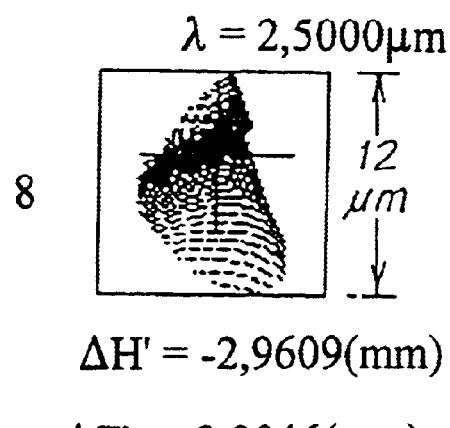
Figure 17:

As may be noted FIGS. 17(A) to 17(C), the size of the spots is in the region of 12 $\mu$m, and the values of the smile and of the spatial co-registration error are very small. These may be obtained from the coordinates H' and Z' in the spectral direction and in the spatial direction, respectively, of the individual spots, the said coordinates being indicated in the figure itself. Designated by Z' are the coordinates of the theoretical points along the spatial direction. The coordinates considered are than equal to 0, 6 and 9 mm along the development of the beam-entry slit. Appearing below each spot are coordinates along the spatial direction (Z') and along the spectral direction (H'), both expressed in mm. The value of the smile or curvature of slit is given by the differences between the values of H' at the band center (1.45 $\mu$m) and between H'+$\Delta$H' at the extremes of the band. The values of the spatial co-registration error are given by the values of $\Delta$Z'.

Figure 18:
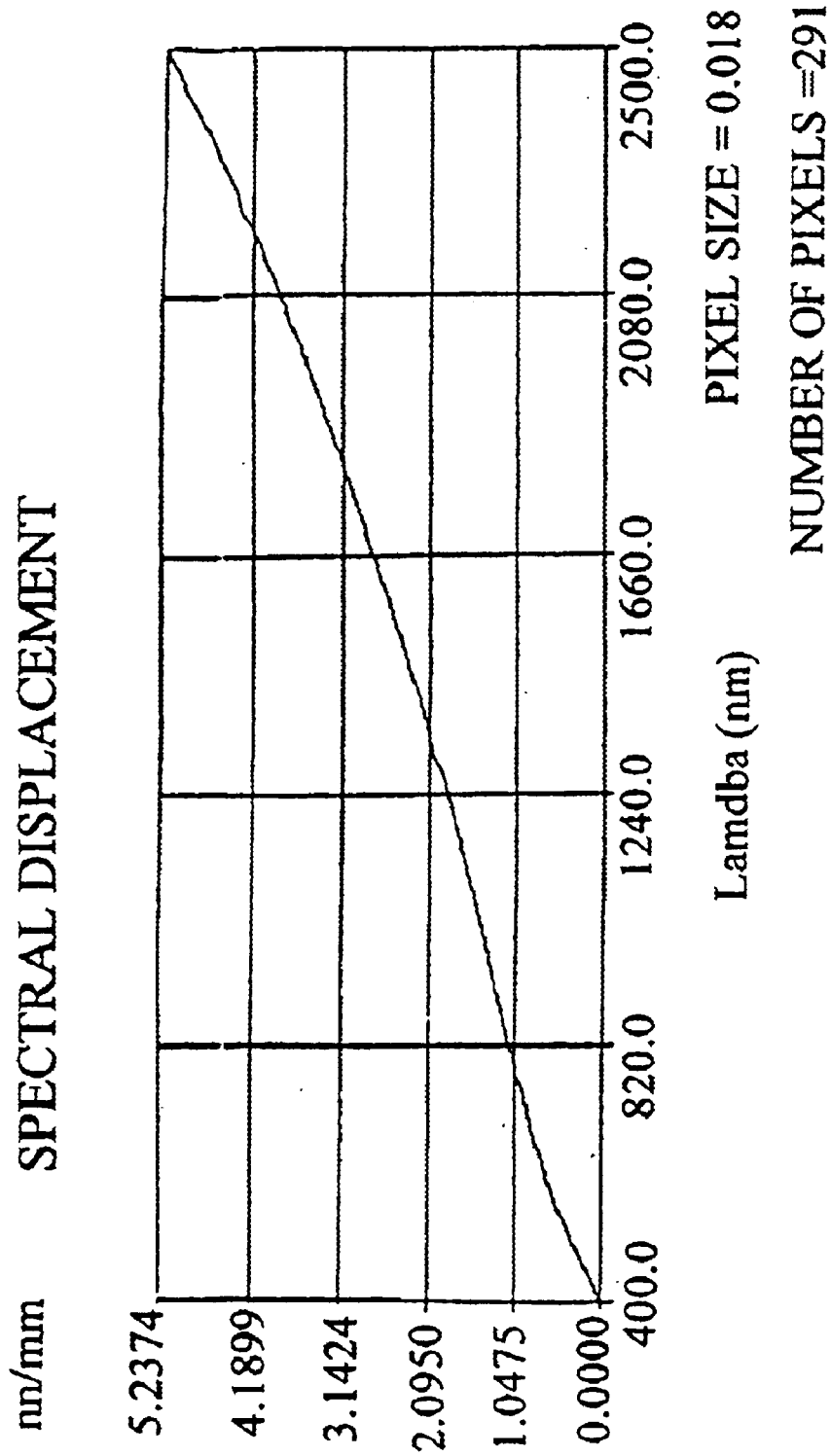
FIG. 18(A) is a diagram representing the spectral displacement of a spectrometer built according to the present invention.
FIG. 18(B) is a diagram representing the spectral dispersion and resolution of a spectrometer built according to the present invention.
Figure 18:
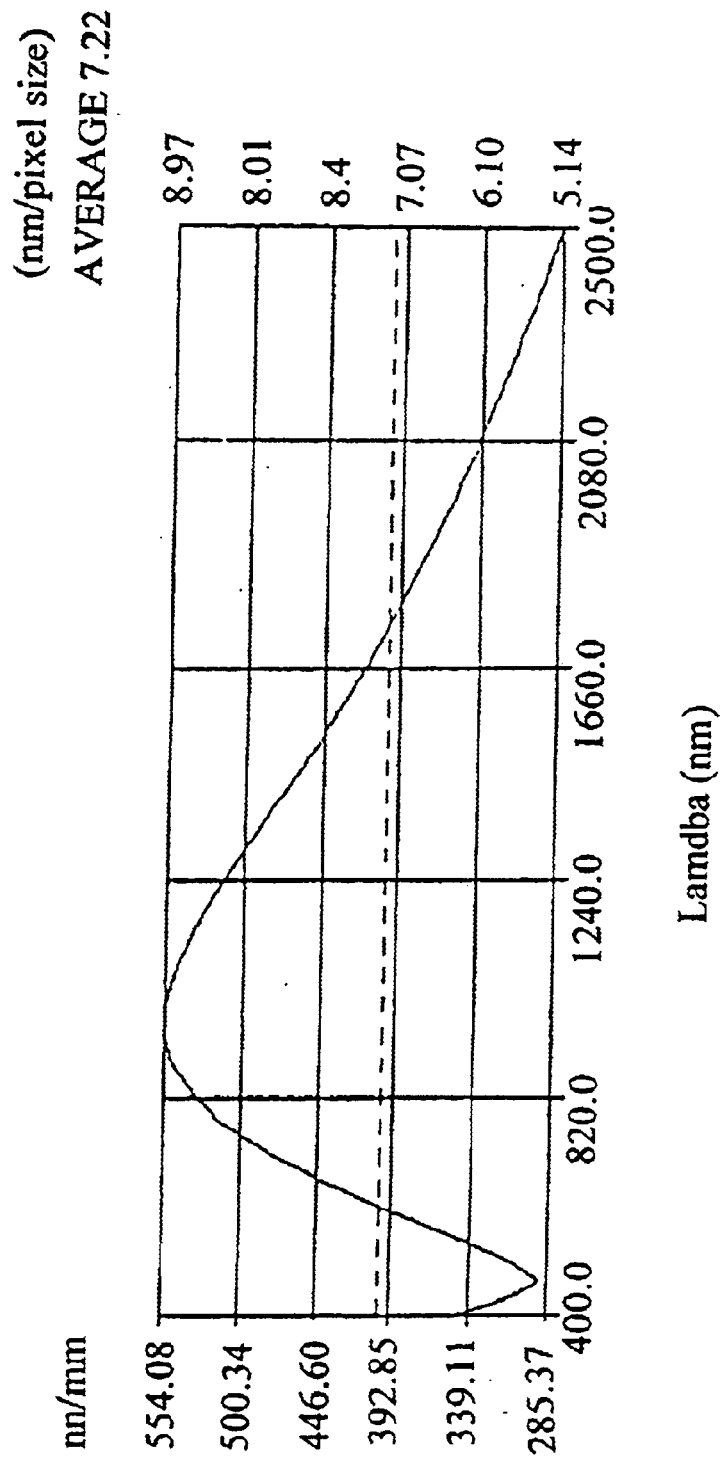

FIGS. 18(A) and 18(B) show, for the same spectrometer, the spectral displacement, the dispersion and the resolution.

What is claimed is:

1. A spectrometer comprising at least one first optical path for a beam of electromagnetic radiation, along which the following are set:
    a beam-entry slit for an incoming beam;
    a collimator for collimation of the incoming beam;
    a first dispersor for dispersion of the beam into its chromatic components;
    a first focusing system; and a first detector which receives the beam dispersed and focused by said first focusing system;
    along said first optical path for said incoming beam, there being set at least a first aspherical corrector element for correction of spherical aberration, wherein:
        said collimator comprises a convergent spherical mirror;
        said first focusing system comprises a convergent spherical mirror; and
        said first aspherical corrector element comprises a first aspherical mirror, wherein said spectrometer further comprises, along said first optical path, at least one second aspherical corrector element.

2. The spectrometer according to claim 1, wherein said first aspherical mirror is associated to said collimator.

3. The spectrometer according to claim 1, wherein said second aspherical corrector element consists of a second aspherical mirror.

4. The spectrometer according to claim 3, wherein said second aspherical mirror is associated to said focusing system.

5. The spectrometer according to claim 2, wherein said convergent spherical mirror of the collimator and the respective aspherical corrector element form part of a Schmidt or Schmidt-Cassegrain off-axis objective.

6. The spectrometer according to claim 4, wherein said convergent spherical mirror of the focusing system and the respective aspherical corrector element form part of a Schmidt or Schmidt-Cassegrain off-axis objective.

7. The spectrometer according to claim 1, wherein, along said first optical path, there is set an optical element for correction of the curvature of field and the curvature of the image of the slit.

8. The spectrometer according to claim 7, wherein said optical element for correcting the curvature of field and the curvature of the image of the slit comprises a divergent spherical mirror.

9. The spectrometer according to claim 8, wherein said optical element for correcting the curvature of field and the curvature of the image of the slit is set along said first optical path between the beam-entry slit and the convergent spherical mirror of said collimator.

10. The spectrometer according claim 1, wherein said first dispersor is a prismatic dispersor.

11. The spectrometer according to claim 1, wherein said first dispersor comprises a dispersor grating.

12. A spectrometer comprising at least one first optical path for a beam of electromagnetic radiation along which the following are set:
    a beam-entry slit for an incoming beam;
    a collimator for collimation of the incoming beam;
    a first dispersor for dispersion of the beam into its chromatic component, wherein said dispersor comprises a dispersor grating;
    a first focusing systems; and a first detector which receives the beam dispersed and focused by said first focusing system;
    along said first optical path there being set at least a first and a second aspherical corrector element for correction of spherical aberration, wherein:
        said collimator comprises a convergent spherical mirror;
        said first focusing system comprises a convergent spherical mirror; and
        said first aspherical Corrector element comprises a first aspherical mirror;
        wherein said dispersor grating is provided on a surface of said first or said second aspherical corrector element.

13. The spectrometer according to claim 12, wherein said collimator and said focusing system have different focal lengths.

14. A spectrometer comprising at least one first optical path for a beam of electromagnetic radiation, along which the following are set:
    a beam-entry slit for an incoming beam;
    a collimator for collimation of the incoming beam;
    a first dispersor for dispersion of the beam into its chromatic components, wherein said dispersor comprises a dispersor grating;
    a first focusing systems; and a first detector which receives the beam dispersed and focused by said first focusing system;
    along said first optical path there being set at least a first and a second aspherical corrector element for correction of spherical aberration, wherein:

said collimator comprises a convergent spherical mirror;

said first focusing system comprises convergent spherical mirror; and said first aspherical corrector element comprises a first aspherical mirror;

said spectrometer further comprising along said first optical path, a beam splitter, downstream of which said first optical path is prolonged and a second optical path develops, there being set at least one second detector along said second optical path.

15. The spectrometer according to claim 14, wherein said beam splitter is set downstream of said first focusing system.

16. The spectrometer according to claim 14, wherein said beam splitter is set downstream of said first dispersor and upstream of said first focusing system, and in that the second optical path comprises a second focusing system and a second detector.

17. The spectrometer according to claim 16, wherein said first optical path and said second optical path each comprise a respective further dispersor downstream of the beam splitter.

18. The spectrometer according to claim 14, wherein said beam splitter is set upstream of said first dispersor, and in that said second optical path comprises a second dispersor, a second focusing system with a respective spherical mirror, and said second detector.

19. The spectrometer according to claim 16, wherein said second optical path comprises a further aspherical corrector element.

20. The spectrometer according to claim 19, wherein said further aspherical corrector element is an aspherical mirror set between said beam splitter and the spherical mirror of the second focusing system.

21. The spectrometer according to claim 19, wherein the spherical mirror of said second focusing system and said further aspherical corrector element form a Schmidt off-axis objective.

22. A spectrometer comprising at least one first optical path for a beam of electromagnetic radiation, along which the following are set:

a beam-entry slit for an incoming beam;

a collimator for collimation of the incoming beam;

a first dispersor for dispersion of the beam into its chromatic components;

a first focusing system; and a first detector which receives the beam dispersed and focused by said first focusing system;

along said first optical path for said incoming beam, there being set at least a first aspherical corrector element for correction of spherical aberration, wherein:

said collimator comprises a convergent spherical mirror;

said first focusing system comprises a convergent spherical mirror; and said first aspherical corrector element comprises a first aspherical mirror, said spectrometer further comprises, along said first optical path, at least one second aspherical corrector element, said second aspherical corrector element consists of a second aspherical mirror, each respective mirror positioned further downstream of the first optical path.

23. A spectrometer comprising:

a beam-entry slit for an incoming beam;

a collimator for collimation of the incoming beam;

a dispersor for dispersion of the beam into its chromatic components;

a focusing system further comprising a convergent spherical mirror;

a first aspherical mirror corrector element for correction of spherical aberration;

a second aspherical mirror corrector element for correction of spherical aberration;

a first detector which receives the beam dispersed and focused by said focusing system; and an optical path for said incoming beam, said optical path defined as a space between said beam-entry slit and said detector, along which said collimator, said dispersor, said focusing system, said first aspherical mirror corrector element, and said second aspherical mirror corrector element are set.

* * * * *